Sept. 9, 1969   K. LINDSTROM   3,465,603

BRAKE ADJUSTING MECHANISM

Filed Nov. 13, 1967

INVENTOR
KENNETH LINDSTROM
BY Beale and Jones
ATTORNEYS

United States Patent Office 3,465,603
Patented Sept. 9, 1969

3,465,603
BRAKE ADJUSTING MECHANISM
Kenneth Lindstrom, 1309 N. 8th St.,
Coos Bay, Oreg. 97420
Filed Nov. 13, 1967, Ser. No. 682,016
Int. Cl. F16h 27/02, 25/02, 29/20
U.S. Cl. 74—89.14                 4 Claims

ABSTRACT OF THE DISCLOSURE

This is a brake adjusting mechanism for adjusting the rotary position of a brake shoe cam shaft with respect to an arm that is coupled to the cam shaft to rotate the same. The cam shaft has its operating arm in the form of a housing which is affixed to an end of the cam shaft and has a portion of the housing projecting transversely to the axis of the cam shaft so as to act as an arm to which a brake applying force is applied such as from a power cylinder. This housing has therein a worm wheel affixed to the cam shaft end that extends into the housing, and also housed therein is a worm meshing with the worm wheel and having a mounting shaft portion extending out from the housing that has a wrench receiving end so that the worm may be turned to adjust the rotary position of the worm wheel and the cam shaft with respect to the housing. After extended operation, trouble has been experienced in maintaining the worm wheel in tight engagement wtih the cam shaft so that there is no relative motion between worm wheel and cam shaft. The cam shaft in this disclosure has a tapered end tapering to a smaller end size that is square in cross section where it receives the worm wheel. The worm wheel has a like tapered central portion that is successively square in cross section which is received on the square in cross section tapered end of the cam shaft. A cup-like shaped fitting having an aperture in its bottom is received over the end of the cam shaft extending and has its walls pressing against the worm wheel. A cap screw extending through the aperture in the bottom of the cup is threadedly received in an axially extending recess in the shaft so that the worm wheel is forced into a tight fit on the cam shaft end. A removable end plate having an aperture therein fits over the cup-like shaped fitting and is secured to the housing by suitable screws.

---

In power air brakes as on trucks and truck trailers, a cam shaft is employed to move the brake shoes into engagement with the brake drum in applying the brakes. There is a slack adjusting mechanism affixed to this cam shaft through which the force is applied to apply the brakes. There is a housing having therein a worm wheel that is attached to the cam shaft by a straight splined portion on the shaft and a like shaped apertured portion in the center of the worm wheel. A worm is also in the housing that meshes with the worm wheel and it has a wrench receiving portion protruding from the housing. The housing acts as an arm and the power cylinder force is applied thereto. To adjust the slack, the worm is turned and this rotates the worm wheel and its attached cam shaft with respect to the housing.

In the course of use, the spline portions on the shaft and worm wheel work against each other, and they are constantly wearing out. It is necessary to replace them about every two years for a truck that is in fairly constant use.

It is the object of this invention to provide in a brake cam shaft, a connection of the shaft to the slack adjusting mechanism that withstands fairly constant use without replacement.

This object is carried out by providing a tapered end square in cross section connection of the worm wheel to the cam shaft in a slack adjuster and a tightening fastening for holding the worm wheel in tight engagement with the tapered portion of the cam shaft.

For a more complete understanding of my invention, reference is had to the drawings and the description which follows in which.

Throughout the description, like reference numbers refer to similar parts.

Figure 1:
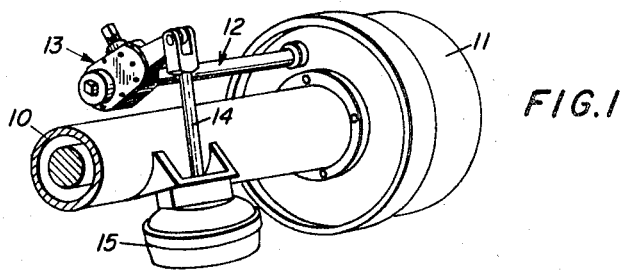
FIG. 1 is a perspective view of a truck axle with cam shaft extending from the slack adjuster to the brake drum.
Figure 2:
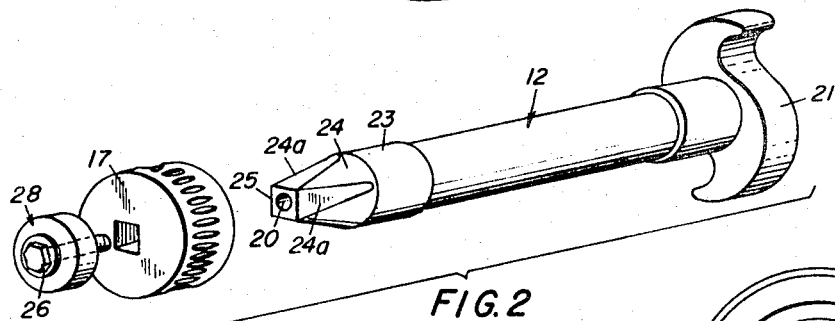
FIG. 2 is an exploded view on an enlarged scale of the cam shaft having a square shaped in cross section tapered end and the worm wheel for reception on the tapered end with securing cup and cap screw.
Figure 4:
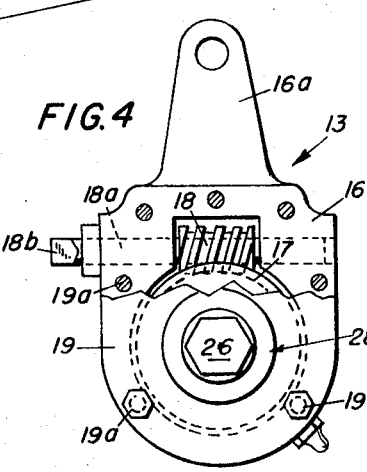
FIG. 4 is an end view on an enlarged scale of the slack adjuster with the upper portion of the end plate broken away to expose the worm.
Figure 3:
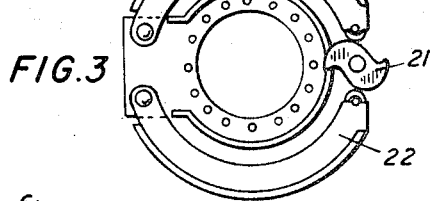
FIG. 3 is an end view of the brake drum and brake shoes with cam operator.

A typical truck axle 10 with brake drum 11 has a cam shaft brake shoe operator 12 mounting a slack adjuster generally indicated at 13 to which is attached a power operating rod 14 extending from a power operator 15.

The slack adjuster 13 has a housing 16 with an integral arm portion 16a extending upwardly therefrom to which is attached the operating rod 14. Within the housing 16 there extends the tapered square in cross section end of cam shaft 12. Mounted on the tapered end of this shaft and within the housing is a worm wheel or gear 17 that has a matching square in cross section center received on the tapered square in cross section end of cam shaft. A worm 18 mounted in the housing 16 meshes with the worm wheel 17 and has mounting shaft 18a extending through a wall of the housing where it has an end portion 18b to receive a wrench. An end plate 19 is attached to each side of the housing 16 by screws or rivets 19a.

The cam shaft 12 has the cams 21 on one end that is housed within the drum for operating the brake shoes 22. The central portion of the cam shaft illustrated is a little smaller in diameter than the ends. The worm wheel receiving end 23 is about 1½ inches in diameter while the central portion is 1⁷⁄₁₆ inches in diameter. The end 23 tapers downwardly toward its extreme end to a square in cross section end 25 of 1³⁄₃₂ inches as here illustrated. There are four flat cuts at 24a in the frustrum of a cone end 24 which taper back on the shaft end from the extreme square in cross section end 25 at the same taper as the frustrum of a cone end 24. A threaded, axially extending recess 20 is formed in the end of shaft 12 to receive a securing cap screw 26.

The worm wheel 17 has a tapered square in cross section center 27 complementary to the tapered generally square in cross section end of the cam shaft. The worm wheel or gear 17 is held tightly on the shaft by a cup-like fitting 28 having a centraly apertured bottom 28a through which extends the securing cap screw 26. The ends of the walls 28b of the fitting 28 press against the outer face of the worm wheel 17 and hold it in a snug fit on shaft 12. The relatively large four flat portions 24a of the shaft end 24 lie in tapered planes that taper from the end 25 where they are normal to each other. The surfaces formed by these planes serve as a firm stabilized base for the complementary shaped central recess 27 of the worm wheel 17. The torque forces applied from the power operator 15 will not loosen the fit of the worm wheel. The securing force applied by the cup-like fitting 28 holds the worm wheel 17 in tight engagement with the shaft 12 at all times. There is thus not permitted even slight relative movement between worm wheel 17 and the cam shaft 12.

The worm 18 is turned by application of a wrench to its end 18b to adjust the relative rotary position of the worm wheel 17 and its attached shaft 12 to the integral arm 16a of the housing 16.

Figure 5:
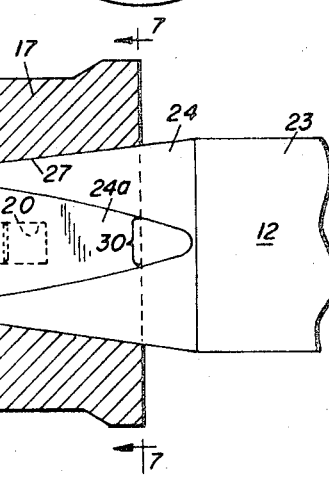
FIG. 5 is a fragmentary sectional view on an enlarged scale of the cam shaft and worm wheel attached.
Figure 6:
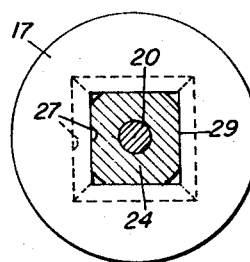
FIG. 6 is a view of the cam shaft and worm wheel along line 6—6 of FIG. 5.
Figure 6:
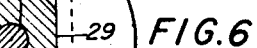
Figure 7:
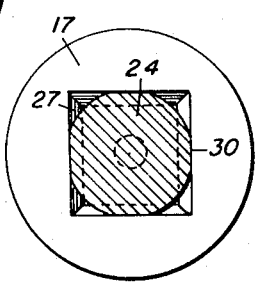
FIG. 7 is a view of the cam shaft and worm wheel along line 7—7 of FIG. 6.
Figure 7:

In FIGS. 5, 6 and 7 there is shown the flat portions 29 and 30 of the tapered cuts 24a on the shaft end 24 where they fit the flat complementary portions within the worm wheel 17.

The gear 17 in meshing with worm 18 has a tolerance within which it may move axially and still be in full mesh with the worm. The take up and securing cap screw 26 and fitting 28 which extends through an aperture in the end plate 19 is easily screwed in to make the worm wheel or gear 17 fit completely tight on the flat tapered portions 24a of the cam shaft at all times.

This arrangement of cam shaft with the worm wheel mounting has proven of great value and reliability in use. It has saved the repeated replacement of the old straight splined coupling of worm wheel mounting in the slack adjuster on the brake applying cam shaft, and has increased the safety of the brake mechanism by eliminating lost motion and time caused by wear on the cam shaft end and worm wheel.

I claim:

1. In a brake adjusting mechanism including a housing having means for attaching an operating rod to the housing, a worm wheel in said housing, a shaft attached to and supporting said worm wheel in the housing and extending through a wall of the housing for brake operation at a wheel, a worm in said housing meshing with said worm wheel, a shaft supporting said worm in the housing and having an end portion extending through another wall of said housing and adapted to receive a suitable turning tool for rotating said worm for adjusting the position of the worm and its supporting shaft with respect to the housing, the improvement wherein said shaft at its end portion where it directly supports said worm wheel tapers downwardly toward its end and is square in cross section at its end and said worm wheel at its center is of like square in cross section and tapered and of a size to receive directly said tapered end of the shaft and means detachably attached to the end portion of the shaft and urging said worm wheel in tight engagement on said tapered end of said shaft, said tapered end portion of the shaft extending axially in along said shaft a greater distance than said worm wheel, said shaft having its end threaded with an axial recess for receiving a cap screw, said means attached to the end of the shaft for urging said worm wheel in tight engagement with said shaft comprising a cup-shaped member having an annular side wall projecting from a centrally apertured bottom, said annular side wall pressing against said adjacent face of the worm wheel, said bottom being spaced from the adjacent end of said shaft, and a cap screw extending through said aperture in the bottom of the cup-shaped member and threadedly received in the threaded axial recess in the end of said shaft.

2. In a brake adjusting mechanism including a housing having means for attaching an operating rod to the housing, a worm wheel in said housing, a shaft attached to and supporting said worm wheel in the housing and extending through a wall of the housing for brake operation at a wheel, a worm in said housing meshing with said worm wheel, a shaft supporting said worm in the housing and having an end portion extending through another wall of said housing and adapted to receive a suitable turning tool for rotating said worm for adjusting the position of the worm and its supporting shaft with respect to the housing, the improvement wherein said shaft at its end portion where it directly supports said worm wheel tapers downwardly toward its end and is square in cross section at its end and said worm wheel at its center is of like square in cross section and tapered and of a size to receive directly said tapered end of the shaft and means detachably attached to the end portion of the shaft and urging said worm wheel in tight engagement on said tapered end of said shaft, said tapered end portion of the shaft extending axially in along said shaft a greater distance than said worm wheel, said shaft at the end adjacent said worm wheel having its taper of successive decreasing in area circular cross sections and the end portion receiving the worm wheel has four flat surfaces extending at the same taper of the worm wheel receiving end of the shaft, said flat surfaces lying in planes perpendicular to each other and forming a square in cross section at the terminal adjacent end of the shaft, said worm wheel having its square in cross section and tapered center received on said end portion of said shaft, the end of said shaft having a threaded axial recess for receiving a securing cap screw, said means attached to the end of said shaft for urging said worm wheel in tight engagement with said shaft comprising, a cup-shaped member having an annular side wall projecting from a centrally apertured bottom, said annular side wall pressing against said adjacent face of the worm wheel, said bottom being spaced from the adjacent end of said shaft, and a cap screw extending through said aperture in the bottom of cup-shaped member and threadedly received in the threaded axial recess in the end of said shaft.

3. In a brake adjusting mechanism including a housing having means for attaching an operating rod to the housing, an adjusting gear in said housing, a shaft attached to and supporting said gear in the housing and extending through a wall of the housing for brake operation at a wheel, an adjusting means for rotating said adjusting gear and the shaft supporting it with respect to said housing and its means for attaching an operating rod, the improvement wherein said shaft at its end portion where it directly supports said adjusting gear tapers downwardly toward its end that receives the adjusting gear and is polygonal in cross section and said adjusting gear at its center is of like polygonal in cross section and tapered and of a size to be directly received by said tapered end of the shaft and means detachably attached to the end portion of the shaft and urging said adjusting gear in tight engagement on said tapered end of said shaft, said tapered end portion of the shaft extending axially in along said shaft a greater distance than said worm wheel, the end of said shaft has a threaded axial recess for receiving a cap screw, said means attached to the end of said shaft for urging said worm wheel in tight engagement with said shaft comprising, a cup-shaped member having an annular side wall projecting from a centrally apertured bottom, said annular side wall pressing against said adjacent face of the adjusting gear, said bottom being spaced from the adjacent end of said shaft, and a cap screw extending through said aperture in the bottom of the cup-shaped member and threadedly received in the threaded axial recess in the end of said shaft.

4. In a brake adjusting mechanism including a housing having means for attaching an operating rod to the housing, an adjusting gear in said housing, a shaft attached to and supporting said gear in the housing and extending through a wall of the housing for brake operation at a wheel, an adjusting means for rotating said adjusting gear and the shaft supporting it with respect to said housing and its means for attaching an operating rod, the improvement wherein said shaft at its end portion where it supports said adjusting gear tapers downwardly toward its end that directly receives the adjusting gear and is splined and said adjusting gear at its center is of like shape and tapered and of a size to be directly received by said tapered and spline end of the shaft and means detachably attached to the end portion of the shaft and urging said adjusting gear in tight engagement on said tapered end of said shaft, said tapered end portion of the shaft extending axially in along said shaft a greater distance than said worm wheel, the end of said shaft having a threaded axial recess for receiving a cap screw, said means attached to the end of said shaft for urging said worm wheel in tight engagement with said shaft comprising, a cup-shaped member having an annular side wall projecting from a centrally apertured bottom, said annular side wall pressing against said adjacent face of the adjusting gear, said bottom of the cup-shaped member being spaced from the adjacent end of said shaft, and a cap screw extending through said aperture in the bottom of the cup-shaped member and threadedly received in the threaded axial recess in the end of said shaft.

References Cited

UNITED STATES PATENTS

| | | | |
|---|---|---|---|
| 1,762,790 | 6/1930 | Odenbach et al. | 74—425 |
| 2,154,055 | 4/1939 | Schurr | 74—425 |
| 3,121,478 | 2/1964 | Bostwick | 188—79.5 |

FOREIGN PATENTS

| | | |
|---|---|---|
| 525,786 | 9/1940 | Great Britain. |

FRED C. MATTERN, Primary Examiner

W. S. RATLIFF, Jr., Assistant Examiner

U.S. Cl. X.R.

188—79.5